2,776,897

METHOD AND COMPOSITION FOR MAKING CERAMIC ARTICLES

Robert Nichols Hazelwood, Milwaukee, Wis., assignor to McGraw Electric Company, Milwaukee, Wis., a corporation of Delaware No Drawing. Application May 6, 1953,
Serial No. 353,427

8 Claims. (Cl. 106—39)

The present invention pertains to improvements in or relating to ceramic products and to a method of preparation of these products.

More particularly, this invention provides a dry process ceramic article and method of preparation which includes the addition of a binder material comprising elements which will promote a more even flow of material in a mold or die, and which will permit higher molding pressures during the pressing operation without deleteriously affecting the ultimate form and green strength of the unfired article.

It is generally agreed that dry-press manufacturing of ceramic articles should be governed by the following characteristics:

a. Any binders added during preparation must burn out, or otherwise be removed from the piece, during the firing process without leaving voids or pin holes in the finished ceramic object.

b. The pressed article should be easily released from the mold or die face.

c. The green strength of the unfired ceramic article must not be affected by the addition of a binder.

d. The particles of the ceramic batch should flow and form an article of uniform density.

e. The mixture including a binder and ceramic material must allow for mold pressures of a high enough degree that will attain the desired shape and density without forming "pressure cones," that is, forming of a laminated structure due to unequal distribution of mechanical pressure, which will later crack on drying or firing. Such structure is described with reference to Fig. 11–1, page 94 in the text "Elements of Ceramics" by F. H. Norton, Addison-Wesley Press, 1952.

The present invention contemplates the use of a ceramic mixture, which includes in combination, a plasticizer, an adhesive, and a mold lubricant, and which further incorporates this combination into a readily usable form which is water-soluble or, at the least, provides a water-dispersible mixture of materials.

Objects of the present invention are to provide a method of preparing a ceramic article from an unfired material comprising powdered ceramic components and a temporary binding material which provides strength to the ceramic mass, flow and plasticity; and in the case of high pressure forming, a ceramic material that will not stick to the mold or die. The binder materials are soluble in water when added to the ceramic in suitable proportions, and will be removed in drying and firing of the ceramic article.

The binder acts with the ceramic mixture to provide an adhesive, a plasticizer and a mold lubricant. The various materials must be compatible with one another to achieve the desired results. Materials suitable for providing green strength to the unfired ceramic article include essentially a series of oxygen-containing polymers, or materials that may be regarded as high polymers or macro-molecules in the general sense. Examples suitable for the practice of this invention include gums, such as gum arabic, polyethylene glycols, polyvinyl alcohols, and natural and synthetic waxes which are soluble in or dispersible in water.

The unfired ceramic article is made plastic with an organic plasticizer such as a condensation product of ethylene oxide and a sulfonamide. These have been found to be water soluble, high boiling, and relatively non-inflammable. The mold lubricant added to the mixture may include polyhydric alcohols, such as pentaerythritol, 2,6-tetramethylol cyclohexanol, or high molecular weight fatty acids, such as the stearic acids, hydroxy stearic acids, and other acids and soaps. It will be apparent that all of the necessary ingredients are chemically compatible with one another and with the ceramic material both in the unfired and fired state.

The preferred composition of the solution contains a total of approximately 20% by weight of the components in water, but may range from 1% to 40%, without deleterious effect. The binder solution to be incorporated with the ceramic batch may vary from 3 to 15%, with a preferred range from between 8 and 10% for pressing at medium to high pressures.

For comparative examples illustrating the present invention, a steatite body of the following composition was chosen:

| | Percent |
|---|---|
| Keystone feldspar (cone 8) | 35 |
| Layton clay | 15 |
| Ceramic talc 99 | 50 |

The foregoing ingredients are further identified by the analyses given below:

Keystone feldspar (cone 8):

| | Percent |
|---|---|
| Silicon dioxide ($SiO_2$) | 67.00 |
| Aluminum oxide ($Al_2O_3$) | 18.00 |
| Potassium oxide ($K_2O$) | 8.90 |
| Sodium oxide ($Na_2O$) | 4.60 |
| Calcium oxide (CaO) | 0.30 |
| Iron oxide ($Fe_2O_3$) | 0.08 |
| Loss on ignition | 1.12 |

Layton clay:

| | |
|---|---|
| Silicon dioxide ($SiO_2$) | 46.68 |
| Aluminum oxide ($Al_2O_3$) | 36.65 |
| Iron oxide ($Fe_2O_3$) | 0.22 |
| Titanium dioxide ($TiO_2$) | 1.10 |
| Calcium oxide (CaO) | 0.11 |
| Magnesium oxide (MgO) | 0.05 |
| Sodium oxide ($Na_2O$) | 0.31 |
| Potassium oxide ($K_2O$) | 0.21 |
| Loss on ignition | 15.28 |

Ceramic talc 99:

| | |
|---|---|
| Silicon dioxide ($SiO_2$) | 56.29 |
| Aluminum oxide ($Al_2O_3$) | 1.07 |
| Iron oxide ($Fe_2O_3$) | 0.43 |
| Calcium oxide (CaO) | 9.26 |
| Magnesium oxide (MgO) | 28.31 |
| Sodium oxide ($Na_2O$) | 0.53 |
| Potassium oxide ($K_2O$) | 0.53 |
| Loss on ignition | 4.02 |

This body fires at 2200° F. with a one-half hour soak at a rate of temperature increase of 500° F. per hour. On firing it is nonporous, has an impact resistance of 2.2 ft. lb./sq. in., a dielectric strength of 290 volts per mil., and an average volume shrinkage of 16.0% from pressed to fired state.

The above steatite batch was mixed with 10% by weight of a binder solution of the following example compositions, that is, 100 parts of steatite batch was mixed with each 10 parts of binder solution made up of the ingredients in the proportions listed below in Examples I and II:

Example I 2 parts of a 2% aqueous soultion of polyvinyl alcohol
13 parts of a 2% aqueous solution of gum arabic

Example II 2 parts of a 2% aqueous solution of gum arabic
1 part of a 10% aqueous solution of 2,2,6,6-tetramethylol cyclohexanol
1 part of a water-soluble condensation product of ethylene oxide and an aromatic sulfonamide, such as Santicizer 134 manufactured by Monsanto Chemical Company In the above examples, the material was thoroughly mixed and screened through a 100 mesh screen. Approximately 20 grams of this material was placed in a cylindrical cavity die of hardened steel 1" in diameter and 4" deep, and pressed with a hydraulic press.

The material of Example I could not be shaped at a pressure exceeding 7.8 tons/sq. in. without forming cracks in the shaped part. At pressures above approximately 6.5 tons/sq. in., the piece adhered strongly to the die faces, and could be removed only with difficulty.

However, with the addition of the materials of Example II, the piece could be compacted at pressures up to 31.8 tons/sq. in. without forming cracks or pressure cones, and at the same time was readily removable from the die.

Santicizer 134 is a high molecular weight, water-soluble condensation product of ethylene oxide and an aromatic sulfonamide. It is a clear, amber colored viscous liquid having a faint characteristic oder with a specific gravity at 25° C. of 1.222–1.23 and a refractive index at 25° C. of 1.5240–1.5250. It is compatible with polyvinyl alcohols and completely or partially hydrolyzed polyvinyl acetate.

Example III

The above steatite body mixture was mixed as above with 10% by weight of a binder solution containing the following:

1 part of Santicizer 134
2 parts of a 2% aqueous solution of polyethylene glycol
2 parts of the penta stearate ester of 2,2,6,6-tetramethylol cyclohexanol ($H_2O$ dispersion containing approximately 10% ester). Thus for each 10 parts of binder solution, 100 parts of the steatite batch were used.

The body was pressed at pressures up to 25 tons/sq. in. without cracking, and the shaped part did not stick to the die face.

Example IV 1 part of Santicizer 134
2 parts of an aqueous solution of a modified polyethylene glycol, such as Carbowax PF–45 manufactured by Carbide and Carbon Chemical Division, Union Carbon & Carbide Corporation.
2 parts of a 10% aqueous solution of the sodium salt of gamma hydroxy stearic cid.

The above material was mixed as before with the given steatite body. It could be pressed up to 25 tons/sq. in. without forming pressure cones or cracks, and did not stick to the die face.

Carbowax PF–45 is a water-soluble wax comprising solid polyethylene glycol similar in appearance to paraffin wax. The particular designated Carbowax PF–45 is a blend of various molecular weights, which may range between 1000 and 6000.

The added binder material was also found to provide excellent plasticity, adhesion and mold lubrication to ceramic body compositions having a true porcelain base comprising clay, feldspar and silica. A typical base composition used in the following examples includes:

| | Percent |
|---|---|
| Ball clay | 10 |
| China clay | 22 |
| Feldspar (cone 8) | 48 |
| Silica | 20 |

This body fires at 2280° F., and on firing is non-porous, has an impact resistance of 1.6 ft. lbs./sq. in., a dielectric strength of 250 volts/ml., and an average volume shrinkage of 16.3% pressed to fired state.

400 grams of the above porcelain body mixture was mixed with 10% by weight that is, 40 grams, of a solution of the following:

Example V 2 parts of a 2% aqueous solution of polyvinyl alcohol
13 parts of a 2% aqueous solution of gum arabic The samples were passed through a 100 mesh screen and placed in a hardened steel die with a cylindrical cavity 2 inches in diameter and 12 inches long. The material was pressed at 15 tons gauge pressure on the ram, corresponding to 4.8 tons/sq. in. The sample could not be removed from the die because of its adherence to the die walls. Application of hydraulic pressures of the order of 2–4 tons on the ram were required to free the piece, which came out badly cracked and coned.

Example VI 1 part of Santicizer 134
2 parts of a 2% solution of gum arabic
2 parts of a 10% solution of 2,2,6,6-tetramethylol cyclohexanol This mixture was added to the above porcelain body in the same proportion as in Example V. The samples pressed as above came out of the die easily and showed no cracks or pressure cones. Upon firing to vitrification, the ceramic showed a dense non-porous body unmarked by any cracks. The slug showed a slightly smaller diameter at a point equidistant from either end, than the end diameters. This is characteristic of pressing such pieces, due to the relatively higher pressures exerted on the ends, with a comparable density increase. Thus, the less dense center portion shrinks more on firing to vitrification.

It will be apparent that a new ceramic material has been provided, which material may be dry-pressed, and comprises in combination therewith in the green, unfired state, a plasticizer, an adhesive, and a mold lubricant, which addition materials are water-soluble or readily dispersible in water. The plasticizer may be chosen from the series of water-soluble condensation products of ethylene oxide and sulfonamides. The adhesive may be selected from a group of polymeric or high-molecular weight organic compounds containing oxygen as hydroxyl, ester, or ether groups, at least one of said group per molecule or monomer unit being of a polymer, as typified by polyethylene glycols, polyvinyl acetates and alcohols, and gums. The mold lubricant may be chosen from the water-soluble polyhydroxyl alcohols, both alkyl, cycloalkyl, and aryl, their fatty acid esters, and the soaps of the higher fatty acids and hydroxy fatty acids.

I claim:

1. The method of forming a shaped ceramic article comprising mixing powdered ceramic material with a sufficient amount of binder material to form a plastic mass, said binder material consisting essentially of a plasticizer consisting of a water-soluble condensation product of ethylene oxide and an aromatic sulfonamide; a water-dispersible adhesive selected from the group consisting of polyethylene glycols, polyvinyl alcohols, polyvinyl acetates, gum arabic, and mixtures thereof; and a water-soluble material selected from the group consisting of 2,2,6,6-tetramethylol cyclohexanol and the penta stearate ester of 2,2,6,6-tetramethylol cyclohexanol as a lubricant; pressing said mixture into a shaped body and firing said body to form said shaped ceramic article.

2. The method of forming a shaped ceramic article comprising mixing powdered ceramic material with a sufficient amount of binder material to form a plastic mass, said binder material consisting essentially of a plasticizer consisting of a water-soluble condensation product of ethylene oxide and an aromatic sulfonamide; a water-soluble adhesive consisting of polyethylene glycol; and a water soluble material selected from the group consisting of 2,2,6,6 tetramethylol cyclohexanol and the penta stearate ester of 2,2,6,6 tetramethylol cyclohexanol as a lubricant; pressing said mixture into a shaped body and firing said body to form said shaped ceramic article.

3. The method of forming a shaped ceramic article comprising mixing powdered ceramic material with a sufficient amount of binder material to form a plastic mass, said binder material consisting essentially of a plasticizer consisting of a water-soluble condensation product of ethylene oxide and an aromatic sulfonamide; a water-dispersible adhesive selected from the group consisting of polyethylene glycol, polyvinyl alcohols, polyvinyl acetates, gum arabic, and mixtures thereof; and 2,2,6,6 tetramethylol cyclohexanol as a lubricant; pressing said mixture into a shaped ceramic body and firing said body to form said shaped ceramic article.

4. The method of forming a shaped ceramic article comprising mixing powdered ceramic material with a sufficient amount of binder material to form a plastic mass, said binder material consisting essentially of a plasticizer consisting of a water-soluble condensation product of ethylene oxide and an aromatic sulfonamide; a water-soluble adhesive consisting of a polyethylene glycol; and 2,2,6,6 tetramethylol cyclohexanol as a lubricant; pressing said mixture into a shaped ceramic body and firing said body to form said shaped ceramic article.

5. A plastic ceramic composition capable of being pressed to shape and fired to form a ceramic article, said composition comprising a powdered ceramic material having intimately mixed therewith a binder material consisting essentially of a plasticizer consisting of a water-soluble condensation product of ethylene oxide and an aromatic sulfonamide; a water-dispersible adhesive selected from the group consisting of polyethylene glycols, polyvinyl alcohols, polyvinyl acetates, gum arabic, and mixtures thereof and a water-soluble material selected from the group consisting of 2,2,6,6 tetramethylol cyclohexanol and the penta stearate ester of 2,2,6,6 tetramethylol cyclohexanol as a lubricant.

6. A plastic ceramic composition capable of being pressed to shape and fired to form a ceramic article, said composition comprising a powdered ceramic material having intimately mixed therewith a binder material consisting essentially of a plasticizer consisting of a water-soluble condensation product of ethylene oxide and an aromatic sulfonamide; a water-soluble adhesive consisting of polyethylene glycol; and a water-soluble material selected from the group consisting of 2,2,6,6 tetramethylol cyclohexanol and the penta stearate ester of 2,2,6,6 tetramethylol cyclohexanol as a lubricant.

7. A plastic ceramic composition capable of being pressed to shape and fired to form a ceramic article, said composition comprising a powdered ceramic material having intimately mixed therewith a binder material consisting essentially of a plasticizer consisting of a water-soluble condensation product of ethylene oxide and an aromatic sulfonamide; a water-dispersible adhesive selected from the group consisting of polyethylene glycols, polyvinyl alcohols, polyvinyl acetates, gum arabic and mixtures thereof and 2,2,6,6, tetramethylol cyclohexanol as a lubricant.

8. A plastic ceramic composition capable of being pressed to shape and fired to form a ceramic article, said composition comprising a powdered ceramic material having intimately mixed therewith a binder material consisting essentially of a plasticizer consisting of a water-soluble condensation product of ethylene oxide and an aromatic sulfonamide; a water-soluble adhesive consisting of polyethylene glycol; and 2,2,6,6 tetramethylol cyclohexanol as a lubricant.

References Cited in the file of this patent

UNITED STATES PATENTS

| 2,649,478 | Carnes | Aug. 18, 1953 |
| 2,662,031 | Vogel et al. | Dec. 8, 1953 |

FOREIGN PATENTS

| 903,817 | France | June 14, 1951 |